July 4, 1961

O. L. CHAZEN 2,990,973

FOOD HEATING AND DISPENSING APPARATUS

Filed Sept. 17, 1957

INVENTOR.
Otto L. Chazen
BY Parker Hardman
Attorneys.

July 4, 1961 O. L. CHAZEN 2,990,973
FOOD HEATING AND DISPENSING APPARATUS
Filed Sept. 17, 1957 5 Sheets-Sheet 3

INVENTOR.
Otto L. Chazen
BY Parker & Frohman,
Attorneys.

July 4, 1961  O. L. CHAZEN  2,990,973
FOOD HEATING AND DISPENSING APPARATUS
Filed Sept. 17, 1957  5 Sheets-Sheet 4

INVENTOR.
Otto L. Chazen
BY Parker & Trochman,
Attorneys.

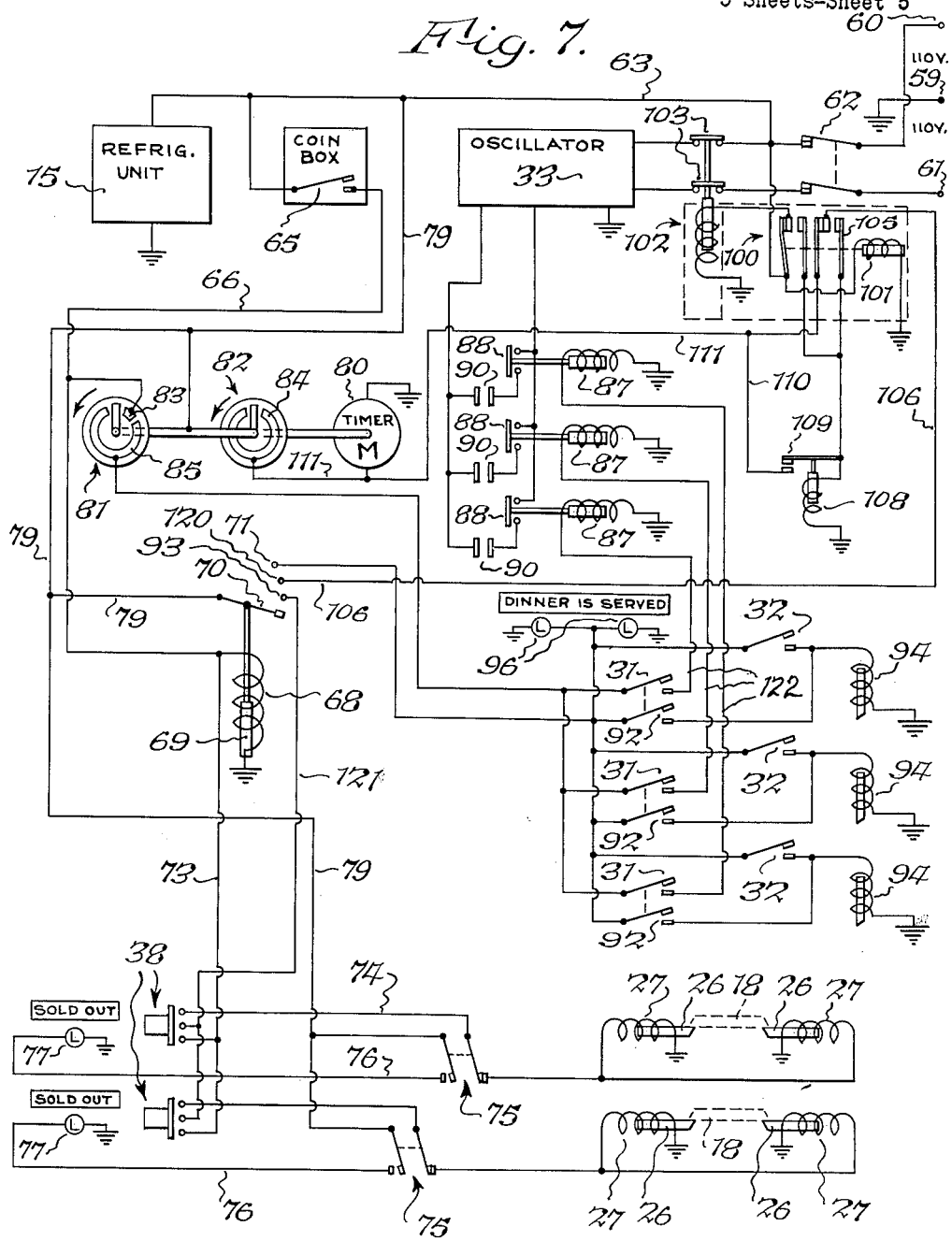

2,990,973
FOOD HEATING AND DISPENSING
APPARATUS
Otto L. Chazen, 102 Wingate Ave., Buffalo, N.Y.
Filed Sept. 17, 1957, Ser. No. 684,599
14 Claims. (Cl. 221—2)

This invention relates to automatic vending machines for use in connection with the sale of precooked and heated foods.

Dispensing or vending machines for selling articles of food such as wieners or hamburgers and heating the same before they are discharged from the machine have heretofore been disclosed. This particular invention, however, contemplates the selling of hot foods, such as precooked dinners, and heating the same rapidly to the desired temperature by means of dielectric heaters.

It is consequently an object of my invention to provide a coin-controlled machine by means of which a ready-cooked dinner on a paper or other non-metallic plate in a refrigerating compartment can be fed by a coin-controlled mechanism into operative relation to a dielectric heater by means of which the dinner on the plate can be very rapidly warmed to the desired temperature, whereupon a door will be opened to permit the dinner to be removed by the customer, and means are also provided for actuating a signal and returning the coins when a certain type of dinner is sold out. Another object of this invention is to provide a machine which can heat and serve foods of this kind rapidly when there is a heavy demand for the same and which may be adjusted so that during times when the demand is less, somewhat longer time is used for serving the food so as to reduce the expense of operating the machine.

Figure 4:
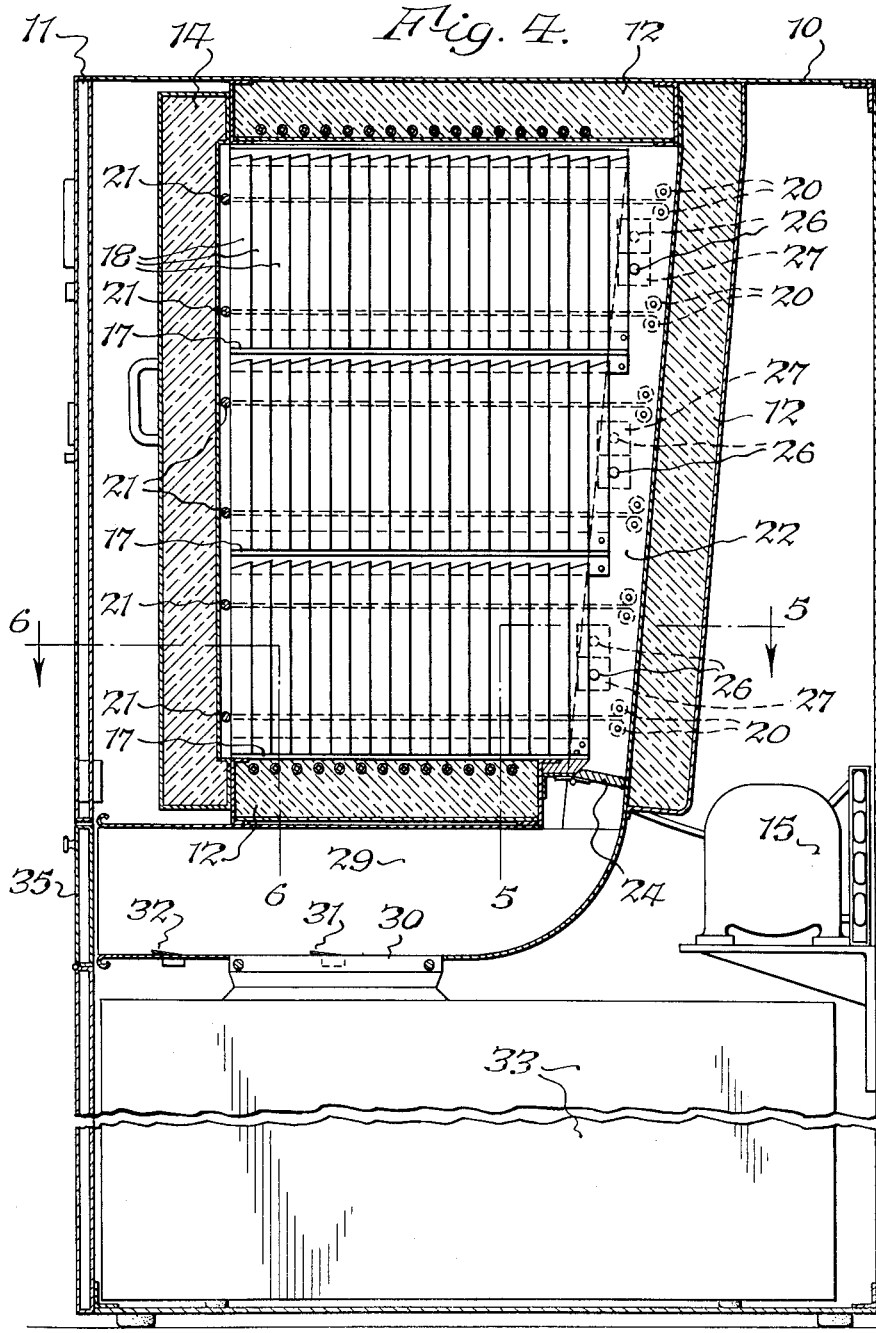
FIG. 4 is a sectional elevation thereof taken approximately on line 4—4, FIG. 3.
Figure 5:
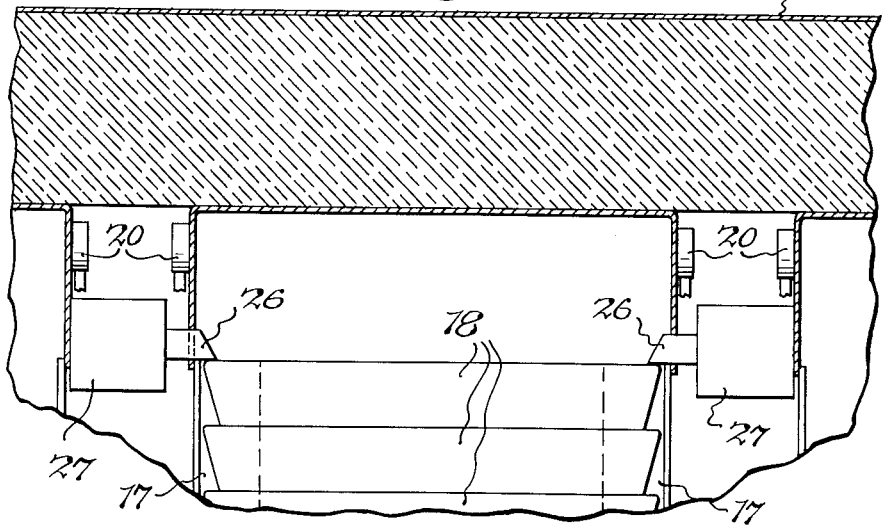
Figure 6:
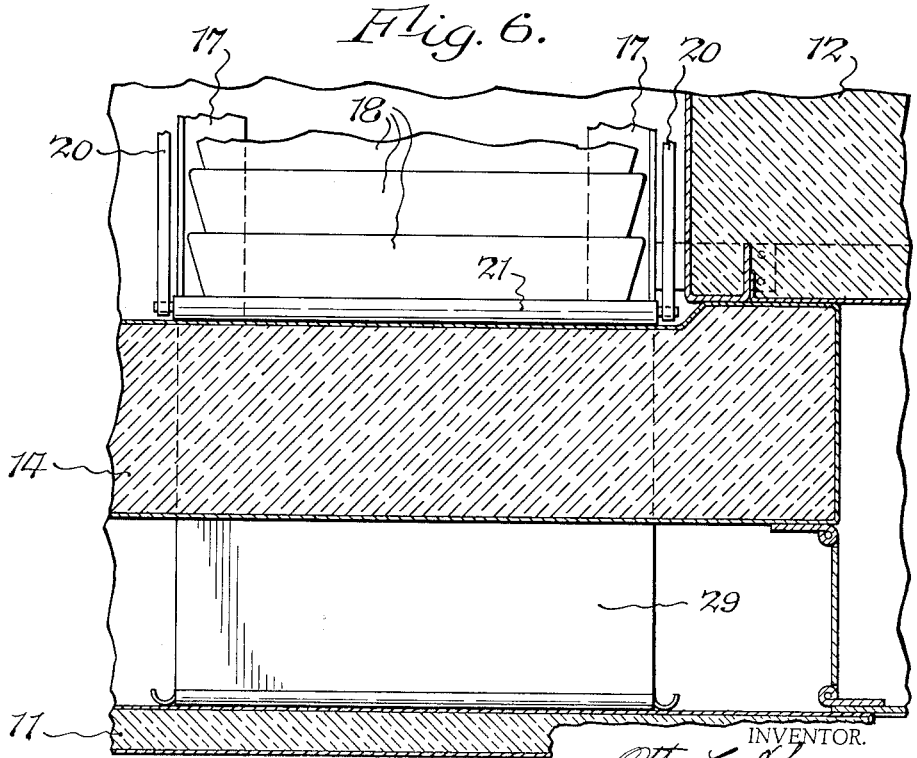

FIGS. 5 and 6 are sectional plan views thereof on lines 5—5 and 6—6 respectively, FIG. 4, on a still larger scale.

FIG. 7 is a diagrammatic view showing the electrical connections between the various parts of the machine.

Figure 1:
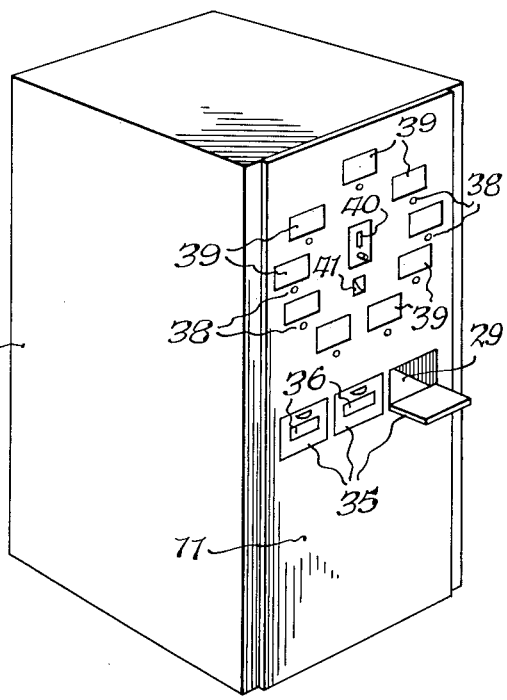
FIG. 1 is a perspective view of a food-heating and dispensing machine embodying this invention.
Figure 2:
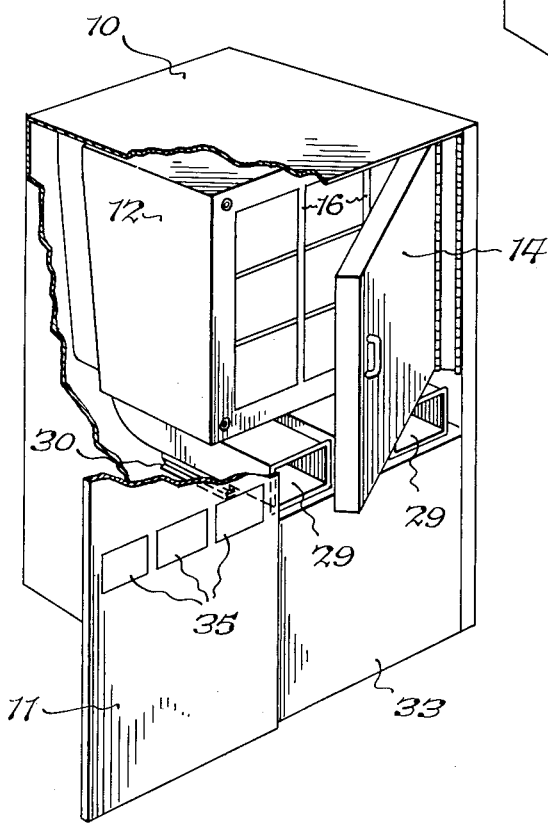
FIG. 2 is a similar view with the front door and the refrigerator compartment door in open and partly open positions and showing my improved apparatus partly in section.

Referring particularly to FIGS. 1 and 2, 10 represents a housing or cabinet which may be made of any suitable or desired material having a door 11 at the front thereof through which access to the machine is provided. Within the upper portion of the cabinet 10 is a refrigerator compartment 12 which has a door 14 on the front face thereof. The refrigerator compartment may be either of the type which chills the precooked food or dinner sufficiently to preserve the same or of the freezer type which maintains the dinners in frozen condition. The interior of the refrigerating compartment 12 may be maintained at a low temperature by any suitable refrigerating unit, such as indicated at 15 in FIG. 4. This refrigerator must, except as hereinafter specified, be of any usual or suitable construction and refrigerated in any customary manner, and since such units are of well known construction, no detailed description of the same is deemed necessary.

The refrigerator is divided into sections for cold storage of dinners or other foods of different kinds so that purchasers may have a selection of the type of dinner or food which they desire. In the construction illustrated by way of example, nine spaces are provided for nine different types of foods or dinners, but it will of course be obvious that the number of spaces or sections for foods may vary as desired. These sections as shown in FIG. 2, are separated by upright partitions 16 and horizontal guide rails or shelves 17, three sections being arranged in upright tiers. The food is arranged on plates 18 or other suitable containers or packages of any desired non-metallic material, such for example as paper, ceramic or plastic material, and these plates with the foods frozen therein are preferably supported in upright or on edge positions so that they can be readily discharged from the rear ends of the several sections into which the interior of the refrigerating cabinet is divided by means of the partitions 16 and guide rails 17. The term "plate" is hereinafter employed to designate any type of holder or container for the food. The plates shown are of approximately rectangular shape and are supported on the guide rails 17 and have their upper open ends of smaller dimensions than their bottoms.

Any suitable means may be provided for feeding the foods rearwardly toward the discharge ends of the compartments, and in the construction shown for this purpose, spiral springs 20 are provided which are similar to clock springs, preferably two of these springs being arranged back to back, FIGS. 4 and 5, and two pairs of these springs are provided which have their rear ends connected to bars 21 arranged to push against the rear food plate of the series so that all of the plates are urged rearwardly by means of these springs. Springs of this type have a tendency to assume curved positions when uncoiled and by arranging them back to back each spring counteracts the tendency of the other spring so that they extend in substantially straight lines from their coils to the bars 22 to which they are connected. Any other means may be provided however to urge the food plates continuously toward their discharge positions. At the rear of each upright tier of freezing compartments is provided an upright space 22 forming a chute and being closed at its lower end by means of a trap door 24 which permits the plates with the food thereon to drop down past the trap door 24, which is preferably kept closed by means of a spring hinge of any suitable type which prevents warm air from entering into the freezing or refrigerating compartment.

Figure 3:
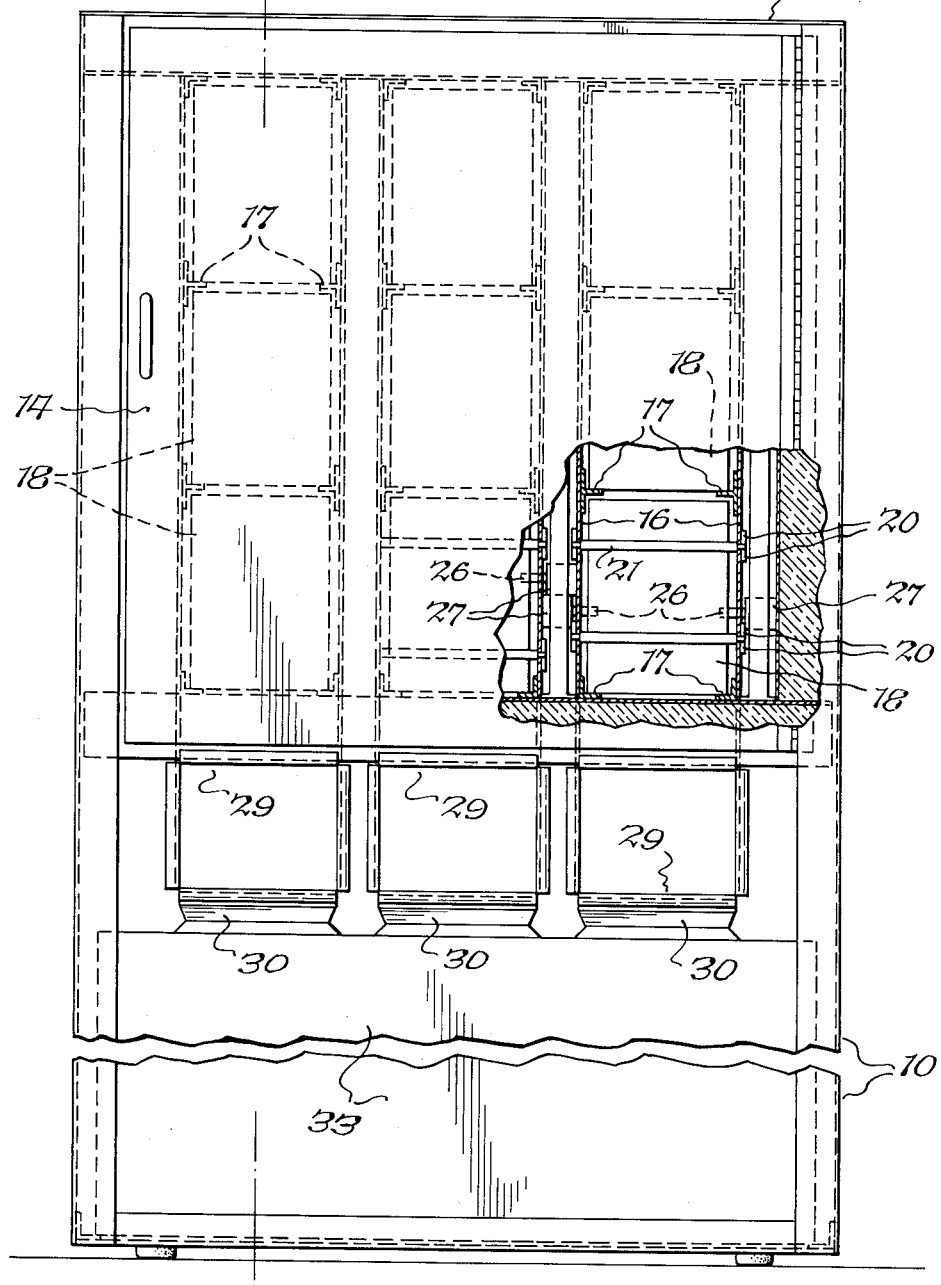
FIG. 3 is a fragmentary front elevation thereof on an enlarged scale with the front door removed.

The discharge of the food plates one at a time from any stack or group of plates may be controlled in any suitable manner. In the construction illustrated by way of example, latches 26 are provided which engage the edges of the plates 18 at opposite sides thereof, see particularly FIGS. 3, 4 and 5. These latches are spring-pressed into their holding positions and removable from the holding positions by any suitable devices, such as solenoids 27. Consequently, when a plate is released by the latches withdrawn by means of the solenoids, the outer plate of the stack will be forced by means of the springs 20 and the rods 21 into the chute 22 from which it will drop downwardly past the trap door 24 and into a substantially horizontal extension 29 of the chute 20.

The food plate 18 will come to rest on a heating surface 30 of any suitable kind which is provided in the middle portion thereof with a movable micro switch member 31 normally held in an upwardly inclined position, as clearly shown in FIG. 4. Any suitable means may be provided for stopping the food plate in correct relation to the heating unit, and in the construction shown, the upper surface of the heating unit is arranged slightly below the surface of the chute, thus forming a shoulder against which the plate may abut. When the plate with the food comes to rest on the heating surface 30, the switch 31 will be depressed so that the dielectric apparatus or power unit 33 will be actuated. Power units of this type for dielectric heating are old and well known and consequently no description of the same is considered necessary. These power units may be made of any suitable size or capacity, depending upon the speed with which the food is to be heated. It is quite feasible to provide a power unit of this type which, when the unit itself has been heated, can heat a plate with food in fifteen to twenty seconds. Consequently, when the machine is installed in a place of business where there is a large demand for foods of this type during certain rush hours, it is of course desirable to have the food heated up quickly so that long delays in serving are avoided.

32 represents a microswitch on which the plate of food may rest when partly withdrawn from the discharge chute 29, this micro switch serving to prevent the door 35 from becoming locked before the heated food is fully removed from the extension 29 of the chute.

Suitable timing means hereinafter described may be employed for interrupting the operation of the power unit after a desired time, and when this happens a light is turned on to indicate on the exterior of the apparatus that the dinner is ready to be served, whereupon a door 35 may be released or opened so that a person can reach into the cabinet and remove the heated food plate therefrom. The cabinet as shown in the drawings is provided with three of these doors, one for each upright stack of food plates, and each door is provided with a suitable indicator, such for example as an illuminated sign 36 advising that the heated food is ready to be removed.

On the front face of the door 11 of the cabinet is provided a series of switches or push buttons 38 by means of which the customer may select the food that he desires, and in the construction illustrated by way of example, over each button or switch 38 is provided a picture or other identification 39 of the food which can be released by pressing the switch or button underneath the picture after the required coin or coins have been deposited in the place provided for that purpose. It will be noted that in the particular illustration there are provided nine of these buttons and nine pictures, one for each of the nine food sections in the refrigerator or freezing compartment 12.

The front door of the cabinet is also provided with a coin slot 40 and a coin-return receptacle 41 into which coins are returned if the type of food selected by the customer has been sold out.

The food heating and vending machine is operated electrically, and since most of the electrically controlled parts are of a type which are available on the open market, it is not considered necessary to show these parts in detail nor their mounting on the several parts of the machine. The diagram of connections shown in FIG. 7 however indicates the electrical circuits and devices by means of which the machine is operated. In this diagram 59, 60 and 61 represent three terminals of a power line, the middle terminal 59 being grounded so that 110 volts or 220 volts may be supplied to the machine. A manually controlled switch 62 of any desired type may be used. This switch is connected to the two terminals 60 and 61 so that the switch controls a 220 volt circuit, but 110 volts can be obtained from either conductor connected with the switch and to the ground. A conductor 63 from the switch 62 supplies power to the refrigerating unit 15, one side of which is grounded, and also to a switch 65 in a coin box into which the coin enters through the slot 40. The coin closes a circuit momentarily from the conductor 63 to a conductor 66 which leads to a grounded solenoid of a step relay 68, the solenoid having a core 69 connected with a movable contact or switch member 70 mounted to contact successively after actuation of the solenoid with a series of fixed contacts 93, 120 and 71 and connect these contacts 93, 120 and 71 with the line 63 through a conductor 79. The momentary closing of switch 65 actuates step relay 68 moving contact 70 into engagement with contact 93. Only two of the dinner selecting switches 38 and the parts actuated thereby are shown in FIG. 7 to simplify the drawing, since the other switches of course will be identical in construction and in their connections. Each of the switches 38 receives current from the conductors 121 and 79 and from conductor 63 through contact 93 of the step relay. The switch 38 closes a circuit through conductor 74 and switch 75 to the solenoids 27 which withdraw the latches 26 which hold a plate of the selected food. The solenoids 27 have self contained contacts so that the latches 26 are immediately returned by their springs to their operative positions to permit only one food article to pass into the chute at a time. The current from any of the dinner-selector switches 38 passes to the solenoids 27 only if the intermediate switch 75 is in the position shown. The switch 75 will occupy its other position when the particular food selected by the customer and controlled by the selector switch 38 is sold out, in which case the closing of the switch 38 will cause current to flow from the conductor 79 through switch 75 to the conductor 76 and to a light or other device 77 which may, for example, illuminate a sign bearing the words "Sold Out." If this is the case, the customer may actuate another switch or button 38 to select another package or plate or he may receive his money back. The mechanism and electrical connections for moving the switch 75 into position to contact the terminal of the connector 76 are not shown for the reason that circuits and mechanism of this type are well known and in common use in many types of vending machines, and such circuit also includes mechanism for returning the money to the customer when a type of article selected by him is sold out. Such a circuit may for example be closed or actuated by the push bar 21 of a section of the refrigerator compartment when it reaches the end of its path of movement or by spiral springs 20, as shown in FIGS. 4 and 5.

The closing of the circuit to the solenoids 27 by a selector switch 38 also results in the actuation of the step relay 68 which opens a circuit including the push button selector switch 38 and the solenoids 27, so that the latches actuated by these solenoids will be returned by their springs, not shown, into position for holding the next food plate. Consequently, when a plate or package of food has been released and discharged down the chute 22 into the extension 29, the movable contact member 70 will contact the second stationary contact 120 and close a circuit from the conductor 79 to a timer motor 80 through the second contact 120, conductor 106, switch 100 and conductor 111. The timer motor 80 is connected by a shaft to the rotary contact members of two timer switches 81 and 82. Each rotary contact member or brush is formed to contact with stationary segments.

Immediately after the start of the timer motor 80, rotary brush of timer unit 81 contacts segment 85, and a circuit is completed to the contacts 122 of double pole micro switch 31 which, when closed, completes a circuit to a solenoid 87 to close a switch 88 which completes a dielectric circuit, including an oscillator or dielectric power unit 33. This results in heating the article resting on the dielectric heater 90. The heating of the article continues until the movable contact of the timer 81 passes beyond the end of the segment 85, which results in breaking the circuit including the conductor 122, the micro switch 31 and solenoid of the switch 88. The rotary brush of unit 81 contacts the short segment 83 which completes a circuit to the step relay solenoid and moves the contact 70 to the contact 71, thus breaking the circuit through the step relay to the timer motor, which, however, will continue to rotate because the rotary brush of timer unit 82 will be in contact with segment 84 which completes another circuit to the timer motor 80 through the conductors 63, 79, the shaft of the timer motor 80, the rotary brush and segment 84 and conductor 111 to the motor 80, and the ground circuit thru contacts 92 of double pole micro switch 31 is completed to solenoid 94, which withdraws a latch for releasing the door 35 and also another circuit through light 96 which illuminates a sign indicating that the dinner is ready to be removed from the chute 29.

Until the plate is fully withdrawn, its weight will keep either contact 92 of micro switch 31 or switch 32 closed; thus solenoid 94 holds the latch for releasing door in a withdrawn position.

The oscillator or power unit receives current at 220 volts through the switch 62 and delivers a potential to the dielectric heater when the switch 88 is closed. The removal of the dinner from the chute 29 enables the switches 31 and 32 to return to open circuit positions so that the cycle may be repeated.

The circuit thus far described is for operation during rush periods when the demand for the articles is heavy, in which case a series of switches 100 are in the position shown in FIG. 7 and when in this position the oscillator 33 is continuously connected with the current supply. Since this oscillator is of a size that can heat a dinner during a short period of time, for example, 15 to 25 seconds, it requires a considerable amount of current to keep the oscillator heated. In order to operate the apparatus more economically, means are provided for interrupting the supply of current to the oscillator during periods of lesser demand, except when the machine is operated by a customer, in which case current is again supplied to the oscillator but the time required for heating the article will be increased by the time required for heating the oscillator. This can be done by delaying the operation of the timer after a customer has placed the machine into operation and this may be done in any suitable manner, for example, by means of the following construction and electrical mechanisms.

These mechanisms include four movable switch members moved by timer motor or solenoid 101 into and out of contact with two stationary contacts. The timer motor 101 may be manually set to operate movable switch members in group 100 at any predetermined time interval. When the movable switch members in group 100 are in the position shown, current will be transmitted to a solenoid 102 which actuates a switch 103 to move the same into closed circuit position, thus supplying current to the oscillator. When the demand for the articles is reduced so that a delay of a minute and a quarter or more will not be objectionable, the oscillator is normally disconnected from the source of power, this being done by moving the two movable switch members shown in the group 100 away from the stationary contacts and moving the other switch members, which in FIG. 7 are shown spaced from the stationary contacts, into engagement with these contacts. When these switches are in this last mentioned position, current from the movable switch member 105 received from its stationary contact through the conductor 106 leading to the second of the three stationary contacts 120, will pass to a time delay relay 108 which may be set to keep a movable switch member 109 in open circuit position for a period of time sufficient to enable the oscillator 33 to become heated. When this occurs then current is conducted from the time delay relay through conductors 110 and 111 to the timer motor 80 which will then begin the rotation of the two movable brushes of the two timer members 81 and 82, whereupon the action will be continued as has been described.

It will be understood that various changes in the details, materials and arrangements of parts which have been herein described and illustrated in order to explain the nature of the invention may be made by those skilled in the art within the principle and scope of the invention as expressed in the appended claims.

I claim:
1. A machine for heating and vending pre-cooked, frozen articles of food on plates, said machine including a cabinet having a compartment adapted to receive said articles in rigidly frozen condition on plates, a plurality of sections in said compartment adapted to receive the articles of different kinds on edge and in parallel relation to each other, means within said cabinet for discharging said articles one at a time from said sections, means turning the articles when discharged from said sections into substantially horizontal positions, a dielectric heating unit within said cabinet to which said articles are passed in substantially horizontal positions, and time-controlled means within said cabinet for permitting removal of said articles from the machine after the heating of the same.

2. A vending machine according to claim 1, in which said means for permitting removal of the articles includes a normally closed door arranged at the discharge end of the path of movement of the articles through the machine, and means for releasing said door for opening when the heating of the article has been completed.

3. A vending machine for heating and dispensing pre-cooked frozen articles of food arranged on a plate including a cabinet, a freezing compartment in said cabinet adapted to store articles to be sold, means for discharging said articles one at a time from said compartment, a chute in said cabinet into which said articles are discharged and which has a curved portion which positions the articles into horizontal positions, a dielectric heating unit to which said chute discharges the articles, a switch in said chute which is closed by an article when positioned in operative relation to said unit, a circuit electrically connected to said switch and including means for supplying dielectric oscillations to said unit, and time-controlled means for opening said last mentioned circuit.

4. A vending machine according to claim 3 and including a stop in said chute independent of said switch for engaging an article to hold the same in correct relation to said unit.

5. A vending machine including a cabinet, a freezing compartment in said cabinet adapted to store on edge frozen food containers in the form of substantially flat plates, said compartments being divided into a plurality of sections which support said containers in substantially upright positions, a chute in which the discharge ends of said sections terminate, and which has an upper upright portion extending substantially parallel with said containers, coin-controlled means for discharging said containers, one at a time from a section to said upright portion of said chute, said chute having a curved portion terminating at its lower end in a substantially horizontal portion, heating means positioned at said horizontal portion of said chute and to which said containers are conducted by said chute, and time-controlled means for actuating said heating means.

6. A vending machine including a cabinet, a freezing compartment in said cabinet adapted to store containers of frozen food, coin-controlled means for discharging said containers one at a time from said freezing compartment, a chute which receives said containers from said compartment, a heating element at the discharge end of said chute, a circuit including a switch located in position to be closed by a container when in operative relation to said heating element, said switch supplying current to said heating element, time-controlled means for stopping the application of heat to said container by said heating element, a signal visible from the exterior of said cabinet which is actuated when the supply of current to said heating element is interrupted after a predetermined interval of time, and an electric circuit including said signal, said circuit being closed by said time-controlled means when said element has heated said food in said container.

7. A vending machine according to claim 3 and including a door at the discharge end of said chute, a latch for normally locking said door, timing means for controlling the length of time during which said dielectric heating means act on said article, and means for releasing said latch to permit the door to be opened and including a circuit which is closed by said timing means when the same interrupts the operation of said dielectric heating means.

8. A vending machine for dispensing hot foods, including a cabinet, a storage compartment in said cabinet divided into sections arranged one above the other and adapted to receive articles of food, means for discharging the articles of food one at a time from said sections, a chute in said cabinet extending into receiving relation to a plurality of said sections and which includes a substantially horizontal terminal portion which receives the articles of food, heating means in said terminal portion positioned to act on said articles of food, a closure member adjacent to said heating means, means for holding said closure member in closed position, time-controlled means for controlling the length of time during which said heating means act on the articles of food, and means for releasing said holding means when the heating of said articles of food is discontinued.

9. A vending machine according to claim 8 and including a switch actuated by the weight of an article, and means operated by said switch for holding said holding means in door-released position until said switch is released of the weight of said article.

10. A vending machine according to claim 5, in which continuously acting pressure means are provided in each section for urging said containers toward the discharge ends of said sections and toward said chute.

11. A vending machine according to claim 5, including selector switches, one for each section for cooperation with said coin-controlled means to release a container from such section.

12. A vending machine according to claim 6 and including a door through which said container may be manually removed, locking means for normally locking said door, and lock-releasing means actuated by said signal actuating circuit.

13. A vending machine for food in containers, a dielectric heating element to which said containers are moved one at a time, coin-controlled means for effecting the movement of said containers one at a time to said heating element, an oscillator for supplying heating energy to said element, a switch for supplying electric current to said oscillator and which is held in closed position continuously during heavy demand for said containers to keep the oscillator heated for immediate use, a timer energized by said coin-controlled means to determine the length of time during which said heating means are subjected to said energy from said oscillator, a switch connecting said heating means with said oscillator and controlled by said timer, a circuit electrically connected to said coin-controlled means for closing said switch which supplies current to said oscillator, and a circuit including a time delay relay interposed between said coin-controlled means and said timer for delaying the operation of said timer until said oscillator has become heated.

14. A vending machine including a cabinet, a freezing compartment in said cabinet adapted to store containers of frozen food, coin-controlled means for discharging said containers one at a time from said freezing compartment, a chute into which said containers are discharged, a heating element to which the containers are delivered by said chute, a circuit including a switch adapted to be closed by a container when in operative relation to said heating element, time-controlled means for stopping the application of heat to said container by said heating element, a signal visible from the exterior of said cabinet which is actuated when said article of food has been heated to the desired extent, an electric circuit including said signal, said circuit being closed by said time-controlled means when the heating of said food in said container has been completed, an oscillator which delivers heating energy to said heating element, a circuit including a switch which delivers electric power to said oscillator and which is in open circuit position when the demand for said containers is not great, an electric circuit including means for moving said last mentioned switch into closed circuit position, and a circuit including a time delay relay for supplying electric power to said time-controlled means.

References Cited in the file of this patent

UNITED STATES PATENTS

| | | |
|---|---|---|
| 1,905,083 | Cramer | Apr. 25, 1933 |
| 2,115,099 | Ferguson | Apr. 26, 1938 |
| 2,363,724 | Ford | Nov. 28, 1944 |
| 2,392,511 | Thompson et al. | Jan. 8, 1946 |
| 2,501,712 | Chodziesner | Mar. 28, 1950 |
| 2,531,238 | Tandler et al. | Nov. 21, 1950 |
| 2,590,580 | Schiavone | Mar. 25, 1952 |
| 2,701,722 | Bone | Feb. 8, 1955 |
| 2,790,379 | Rothstein et al. | Apr. 30, 1957 |
| 2,831,419 | Timm | Apr. 22, 1958 |
| 2,839,649 | Macoicz | June 17, 1958 |
| 2,901,964 | Johnson | Sept. 1, 1959 |